United States Patent [19]

Wright

[11] 4,392,165

[45] Jul. 5, 1983

[54] HEAD LIFT MECHANISM

[75] Inventor: Harold T. Wright, San Carlos, Calif.

[73] Assignee: Disctron, Inc., Milpitas, Calif.

[21] Appl. No.: 248,808

[22] Filed: Mar. 30, 1981

[51] Int. Cl.³ .................... G11B 5/54; G11B 5/012; G11B 21/22; G11B 21/16

[52] U.S. Cl. .................................. 360/105; 360/98; 360/104

[58] Field of Search ............... 360/105, 104, 102, 103, 360/99, 98

[56] References Cited

U.S. PATENT DOCUMENTS

| | | | |
|---|---|---|---|
| 3,946,439 | 3/1976 | Castrodale | 360/105 |
| 3,984,873 | 10/1976 | Pejcha | 360/98 |
| 4,086,637 | 4/1978 | Helbers | 360/105 |
| 4,315,289 | 2/1982 | Holecek | 360/99 |
| 4,327,388 | 4/1982 | Wanek | 360/104 |

Primary Examiner—Robert M. Kilgore
Attorney, Agent, or Firm—Spensley, Horn, Jubas and Lubitz

[57] ABSTRACT

A mechanism for loading and unloading magnetic heads from the surfaces of a magnetic disc is described. The invention uses lift rods which are pivoted about a portion of their length and have offset sections which cooperate with the head lift arms or mounting flexures upon which the magnetic heads are mounted. The lift rods are controlled through other offset sections located along their lengths. These other offset sections, in the preferred embodiment, are pressed against conical surfaces which are oriented so that the axes of the surfaces are in a direction perpendicular to the pivoting axes of the lift rods. Movement of the conical surfaces toward and away from the pivoting axes of the lift rods imparts an arcuate motion to the offset sections of the lift rods with which they cooperate, and this correspondingly produces arcuate motions in the offset sections which cooperate with the head mounting flexures. By this motion, the magnetic heads are gently loaded or unloaded onto or from a magnetic disc. In the preferred embodiment, the motion of the conical surfaces are accurately controlled by a linear stepper motor.

8 Claims, 8 Drawing Figures

HEAD LIFT MECHANISM

FIELD OF THE INVENTION

The present invention relates to the field of mechanisms for loading and unloading magnetic recording and reading transducers or heads from the surfaces of a magnetic recording disc.

BACKGROUND OF THE INVENTION

Until recently, Winchester style magnetic heads have been used exclusively in disc-drive systems having non-removable discs, obviating the need to load and unload heads from the discs. With the advent of removable discs in systems using Winchester style heads, the need to load and unload these heads has arisen.

Prior to the use of Winchester heads, heads of other designs could be loaded and unloaded onto magnetic discs. In general, the loading onto the magnetic disc was done onto a rotating disc. The combination of the rotating disc and a large air bearing resulting from the use of a head slider having considerable area avoided damage to the disc. However, with the smaller slider areas of Winchester style heads, it is desirable that the loading of the head be onto a stationary disc.

The previously used mechanisms for loading and unloading magnetic heads depend upon solenoid or springdriven motion. Some of these mechanisms attempt to control the velocity of the moving heads by the inclusion of a dashpot damper. In general, however, a solenoid moves the head in one direction while a spring, controlled by the dashpot, moves the head in the other direction. Mechanisms using solenoids and dashpots, however, have a number of disadvantages, one of the primary ones being the high cost of suitable solenoids and dashpots. Also, the velocity of the magnetic heads cannot be controlled with precision by such mechanisms under certain circumstances.

The present invention overcomes all these disadvantages in providing a mechanism that is easy to assemble and therefore relatively inexpensive, as well as reliable.

SUMMARY OF THE INVENTION

A primary object of the present invention is to provide a mechanism which can impart an accurate uniform motion to magnetic heads during their loading and unloading onto a rotatable magnetic disc. A second object of the present invention is to perform the described function with a mechanism which is relatively simple, easy to assemble and reliable.

The present invention achieves these objects by the use of a pivoted lift rod having an offset section which is disposed adjacent to the head lift arm or head mounting flexure upon which the magnetic head is mounted. The lift rod is pivoted for a section of its length about an axis which is generally in or parallel to the plane of rotation of the magnetic disc. The rotation of the lift rod about its axis causes the offset section of the lift rod disposed adjacent to the head mounting flexure to rotate in a arc. Since the head mounting flexure is generally preloaded so that it tends to press the magnetic head into contact with the disc, the offset section of the lift rod is normally located on the side of the head mounting flexure toward the disc, so that by a rotation of the lift rod on its axis in the proper direction, the head mounting flexure and thus the magnetic head is pushed away from the disc.

In the present invention it is preferred to use a lift rod which is pivoted along a section of its length in a direction generally perpendicular to the plane of motion of the head mounting flexure. The offset section which contacts the head mounting flexure is parallel to the pivoted section and contacts the head mounting flexure over its entire width. The lift rod has, preferably, a second offset section on the side of the pivoted section opposite to that of the first offset section.

It will readily be appreciated that movement of the second offset section of the lift rod along an arc centered on the pivot axis of the lift rod produces a corresponding motion of the first offset portion of the lift rod. The second offset section presses against an inclined edge or surface which faces the lift rod and moves in a direction perpendicular to the pivot axis of the lift rod. The arcuate motion of the second offset section of the rod is provided by linearly moving the inclined edge or surface in a direction perpendicular to the pivot axis of the lift rod. Since the second offset section is pressed against the inclined edge or surface, retracting the inclined edge or surface in the direction away from the pivot axis of the lift rod permits the second offset section to press against a lower portion of the inclined edge or surface and to thereby arcuately move about the pivot axis of the lift rod. In the preferred embodiment, where a magnetic head is mounted on a head mounting flexure or lift arm on each side of the magnetic disc and two lift rods are used, a wedge or conically surfaced ramps may be used to provide the inclined edges or surfaces.

The first and second offset sections of each lift rod are oriented angularly about the pivot axis with respect to one another so that as the cooperating inclined surface is retracted away from the pivot axis, the first offset section travels along an arc and permits the magnetic head to be gently loaded upon the magnetic disc.

In order to move the inclined edge or surface back and forth in a direction perpendicular to the pivot axis of the lift rods, it is preferred to use a linear stepper motor in order to linearly displace a rod to which the inclined edge or surface is attached. With a stepper motor, the inclined edge or surface can be moved with a constant average velocity which can be varied by changing the driving pulse rate. Also, with a stepper motor, a high degree of control of the average velocity of the motor is possible, and hence, the ability to control the velocity of the magnetic heads during loading and unloading is enhanced.

In the preferred embodiment, the pulse train to the linear stepper motor is provided by a microprocessor which is also used to control the other components within the disc-drive assembly. The use of microprocesser control for the mechanism has the additional advantage of eliminating or reducing the need for limit switches.

An additional feature of the present invention, in its preferred embodiment, is a member attached to one of the lift rods in order to restrain the carriage on which the magnetic heads are carried from moving toward the disc when the magnetic heads are in the lifted position. This member, however, is rotated out of the way of the carriage when the lift rod is rotated in order to load the magnetic heads onto the disc.

The novel features which are believed to be characteristic of the present invention, both as to its organization and as to its method of operation, together with further objectives and advantages thereof, will be better understood from the following description, considered in connection with the accompanying drawings, in which a presently preferred embodiment of the invention is illustrated by way of example. It is expressly understood, however, that the description of the preferred embodiment and drawings are for the purpose of illustration and description only, and are not intended as a definition of the limits of the invention.

DESCRIPTION OF THE PREFERRED EMBODIMENT

Figure 1:
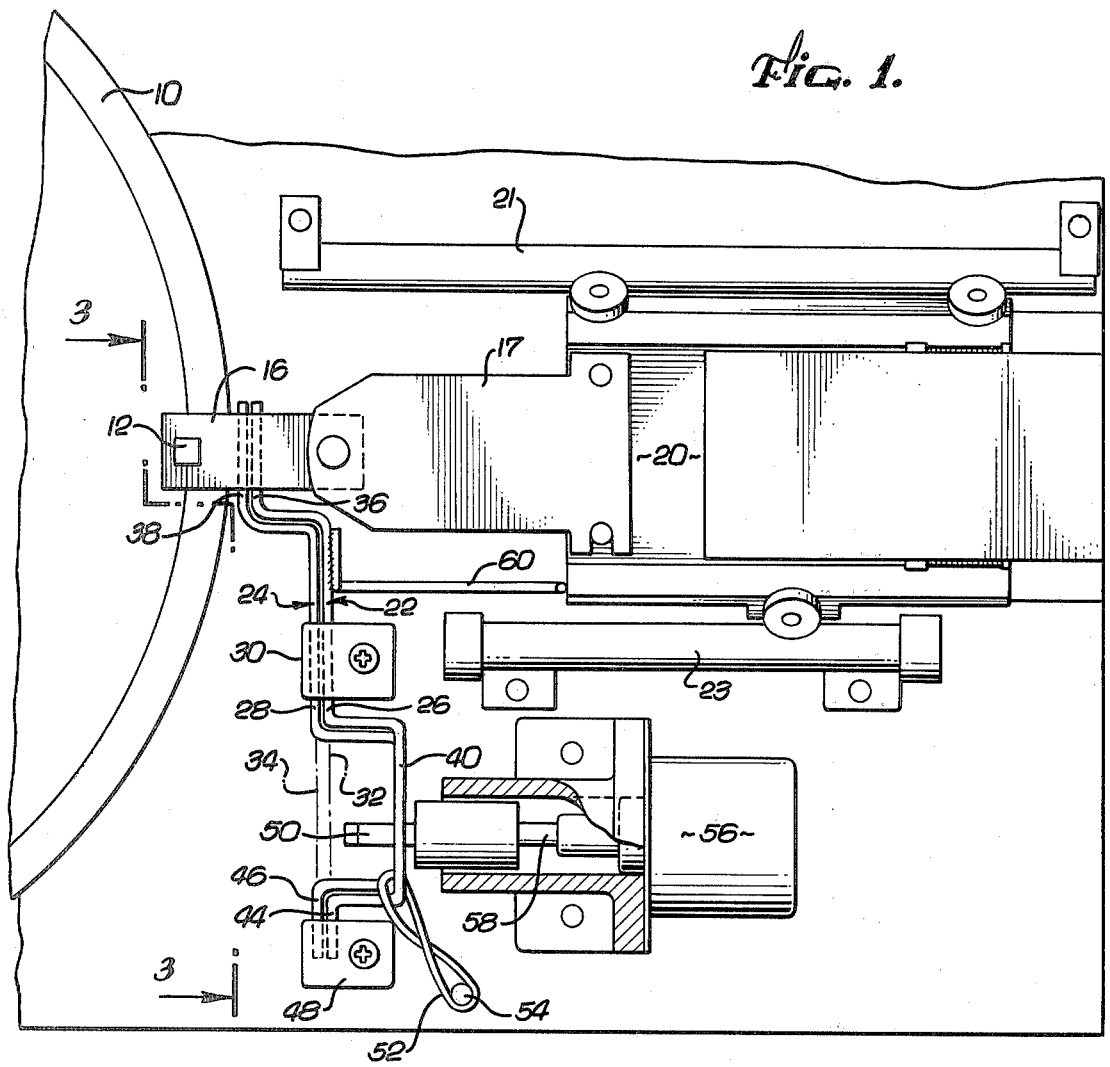
FIG. 1 is a plan view of a preferred embodiment of the present invention as used in a disc-drive assembly.

The present invention is for a mechanism which gently loads and unloads one or more magnetic heads onto and from a rotatable magnetic disc. The head is mounted on a head lift arm or head mounting flexure attached to a carriage in the disc-drive assembly. The carriage moves in a direction along a radius of the disc so that the head may be placed in proximity with any of the circumferential tracks located on the disc.

It is desirable to use both sides of the magnetic disc simultaneously. Thus, in the preferred embodiment to be described herein, the carriage carries two magnetic heads, each located on a head mounting flexure attached to a structural member secured to the carriage. These heads may be placed into contact with the two sides of a magnetic disc. Hence, the preferred embodiment of the present invention to be described herein is a mechanism which can be used to load or unload both heads simultaneously onto or from the two sides of the disc.

To achieve this end, the present invention uses a pivoted lift rod to press upon each head mounting flexure. The lift rods are pivoted about axes which are in, or parallel to the plane of the rotating disc and which are perpendicular to the plane of motion of the head lift arms as they load and unload the heads.

Each pivoted lift rod has an offset section oriented parallel to the pivot axis. As the lift rod is pivoted about its pivot axis, this offset section moves along an arc and may be brought into contact with the corresponding head lift arm.

Normally, the head mounting flexure is preloaded so that it presses against the magnetic disc in the absence of a force tending to unload it from the disc. Such a force tending to unload the head from the disc is provided by the pivoted lift rod, whose offset section is located in the area between the plane of the magnetic disc and the head mounting flexure. Thus, when the lift rod is pivoted in the proper direction about its axis, the offset section of the lift rod lifts the head mounting flexure and thus unloads the magnetic head from the disc.

The rotational force applied to the lift rod is applied, in the preferred embodiment, to a second offset section of the lift rod located on the side of the pivoted section of the lift rod opposite to that of the first offset section. This second offset section, like the first offset section described above, is also preferably parallel to the axis of the lift rod.

Movement of this second offset section in an arc about the pivot axis of the lift rod will produce a corresponding arcuate movement of the first offset section. It will be appreciated that any of a number of means for moving the second offset section along an arc may be provided. Presently, it is preferred to use the inclined portion of a ramp member which faces the lift rod and moves in a direction perpendicular to the pivot axis of the lift rod in order to impart an arcuate motion to the second offset section of the lift rod. The second offset section of the lift rod presses upon this inclined portion so that as the ramp member is moved toward and away from the axis of the lift rod, the second offset section is lifted or lowered because of its contact with the inclined portion of the ramp member. This movement of the second offset section, of course, is along an arc, so that a corresponding arcuate movement of the first offset section is thereby provided.

The angular separation about the pivot axis of the first offset section from the second offset section can be conveniently chosen so that when the second offset section rests on the highest part of the inclined portion of the ramp member, the first offset section presses the corresponding head mounting flexure in a direction away from the magnetic disc, thereby lifting the magnetic head from the disc. Similarly, as the second offset section presses on lower portions of the inclined portion of the ramp member (as the ramp member is moved), the first offset section moves arcuately in a direction closer to the magnetic disc, thereby allowing the head mounting flexure and the magnetic head to move toward the disc, and the magnetic head to be loaded upon the disc.

Since in the preferred embodiment, two magnetic heads must be loaded and unloaded from the magnetic disc, and two lift rods must be employed, it is desirable to use a single mechanism to provide the force on the two second offset sections of the lift rods in order to simultaneously move the head mounting flexures and the magnetic heads. Thus, the angular separation about the respective axes of the first and second sections of both lift rods are chosen so that the second sections of both lift rods may ride along oppositely disposed edges of conical surfaces having axes oriented in directions perpendicular to the pivot axis. The conical surfaces provide the required inclined portions for the two second offset sections of the lift rods, which bear against the oppositely disposed conical surfaces. The conical surfaces are selected so that the required angular displacement is provided to each head mounting flexure, and may differ depending upon the offsets and positioning of the two lift rods. Thus, motion of the dual conical surfaces in a direction perpendicular to the pivot axis causes the head mounting flexures and the magnetic heads to be loaded and unloaded onto and from the magnetic disc as described above.

The movement of the dual conical surfaces is accomplished by means of a linearly moving shaft driven by an electric stepper motor. A stepper motor has been chosen for the preferred embodiment because of the ability to accurately control it by means of pulses from a microprocesser. Moreover, low cost stepper motors having a linear output are now readily available.

The present invention will now be described more particularly with respect to the drawings. In FIG. 1, a plan view of the preferred embodiment of the present invention as it might be used within a disc-drive assembly is shown. A cartridge (not shown) containing a magnetic disc 10 is placed within the disc-drive assembly. Access to the two magnetic surfaces of the magnetic disc 10 by magnetic heads 12 and 14 is provided by a door located in the side of the cartridge. Since FIG. 1 is a plan view, only one magnetic head 12 is shown, the second magnetic head 14 being located on the opposite side of the disc 10 opposite to magnetic head 12.

Magnetic head 12 is mounted on head lift arm or head mounting flexure 16, while magnetic head 14 is mounted on head mounting flexure 18. Head lift arm 18 is not shown in FIG. 1 as it would be directly beneath head mounting flexure 16, although both head mounting flexures 16 and 18 and magnetic heads 12 and 14 may be seen in FIG. 2.

The head mounting flexures 16 and 18 have a degree of elasticity which permits them to be flexed in order to remove their respective heads 12 and 14 from the disc 10. However, they are mounted on rigid structural members 17 and 19, respectively, which are secured to carriage 20.

Access by the magnetic heads 12 and 14 to the different tracks located on the disc 10 is provided by the use of a carriage 20, shown generally in FIG. 1, which moves along rails 21 and 23 in a direction along the radius of the disc 10, thereby allowing the magnetic heads 12 and 14 to be placed in proximity with the different tracks on the magnetic disc 10.

Figure 8:
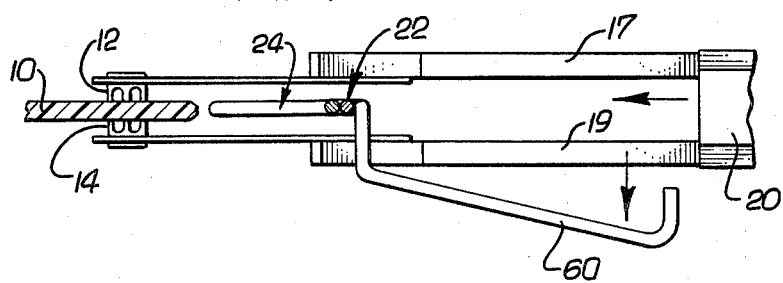
FIG. 8 is a sectional view taken along the lines 8—8 of FIG. 6 in the direction of the arrows and is a view similar to that shown in FIG. 5.

The magnetic heads 12 and 14 are loaded onto the disc 10 at a position near its edge when the disc 10 is stationary. Once the heads 12 and 14 are loaded upon the disc 10, the disc 10 is rotated. The relative motion of the disc 10 and the heads 12 and 14 creates air bearings between the disc 10 and the heads 12 and 14 so that the heads 12 and 14 need not be lifted from the disc 10 when it is desired to reposition them radially on the disc 10 to a different track. This radial repositioning of the heads 12 and 14 is accomplished by means of the carriage 20 moving along its rails 21 and 23, with the head 12 and 14 in the loaded position such as is shown in FIG. 8. When it is desired to remove the cartridge from the disc-drive assembly, the magnetic heads 12 and 14 are moved by means of the carriage 20 to the edge of the disc 10 where they are unloaded from the disc 10 be means of the present invention.

Figure 2:
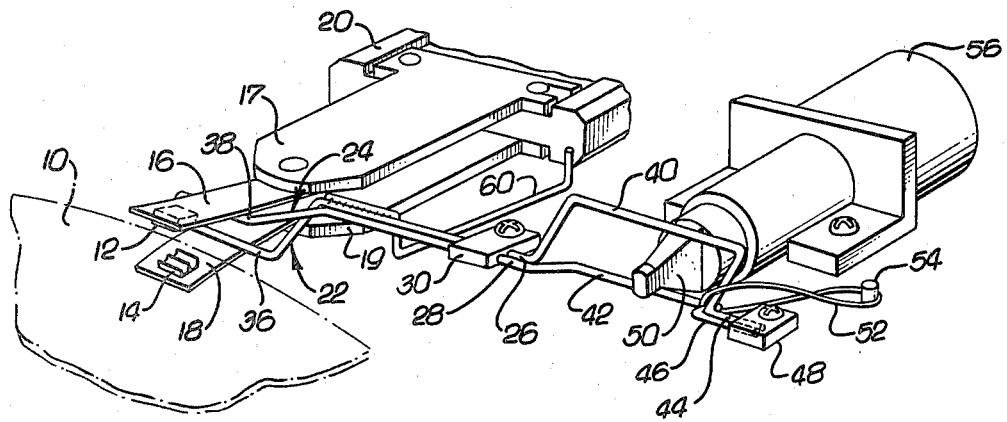
FIG. 2 is a perspective view, partially cut away, of the preferred embodiment of the present invention shown in FIG. 1, with the magnetic heads not loaded onto the magnetic disc.
Figure 3:
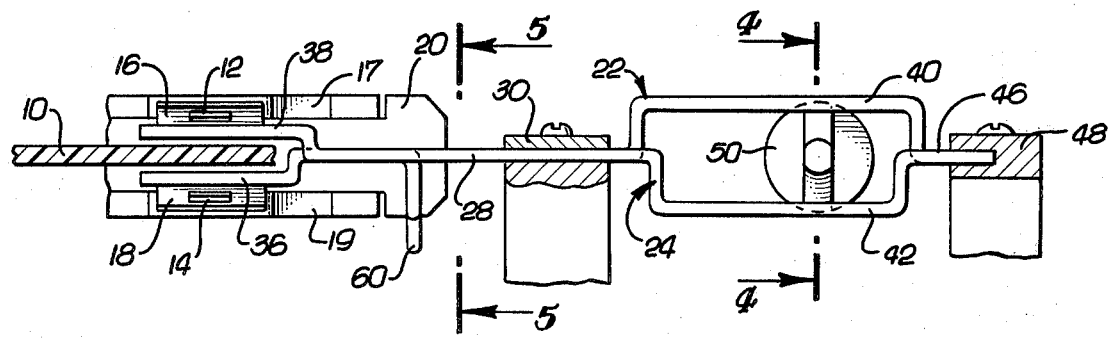
FIG. 3 is a sectional view taken along the lines 3—3 of FIG. 1 in the direction of the arrows.

In order to unload the magnetic heads 12 and 14 from the disc 10, lift rods 22 and 24 are used. The general configurations of lift rods 22 and 24 are best seen in FIGS. 1 and 2. Lift rods 22 and 24 each have, near their middle, short, straight pivoting sections 26 and 28, respectively. The pivoting sections 26 and 28 are mounted in bearings located in mounting block 30, which bearings allow the pivoting sections 26 and 28 to rotate respectively about axes 32 and 34 coinciding with the center line of the respective pivoting sections 26 and 28. Axes 32 and 34 will hereafter sometimes be referred to as the axes of the lift rods.

Lift rod 22 has a first offset section 36 which is parallel to the axis 32 of lift rod 22 and is adjacent to the head mounting flexure 18. Similarly, lift rod 24 has a first offset section 38 which is parallel to the axis 34 of lift rod 24 and which is adjacent to the head mounting flexure 16.

On the opposite side of mounting block 30 from the first offset section 36, lift rod 22 has a second offset section 40, which is also parallel to the axis 32 of lift rod 22. Correspondingly, lift rod 24 has a second offset section 42 on the same side of mounting block 30 as second offset section 40 of lift rod 22. Second offset section 42 is parallel to axis 34 of lift rod 24.

A short pivoting section 44 of lift rod 22 is located on the side of the second offset section 42 opposite to the pivoting section 26 and lies along the axis 32 of lift rod 22. Similarly, a short pivoting section 46 of lift rod 24 lies along the axis 34 of the side of the second offset section 42 opposite to that on which the pivoting section 28 is located. The short pivoting sections 44 and 46 are mounted in bearings in a terminating mounting block 48. The inclusion of the short pivoting sections 44 and 46, while not necessary, helps to insure that the lift rods 22 and 24 do not become cocked sideways or slide in an axial direction.

From the above description of the lift rods 22 and 24, it will be appreciated that the second offset section 40 of the lift rod 22 may be rotated in an arc about axis 32, lift rod 22 pivoting on its pivoting section 26 and its short pivoting section 44. This motion produces a corresponding arcuate motion of the first offset section 36 of the lift rod 22. This arcuate motion of the first offset section 36 may be used, depending on its direction, to lift or lower head mounting flexure 18. Similarly, the second offset section 42 of lift rod 24 may be moved along an arc to produce a corresponding arcuate movement of the first offset section 38 which may be used to lift or lower head mounting flexure 16.

It is preferred to use dual conical surfaces or ramps 50 to cooperate with the second offset sections 40 and 42 of the lift rods 22 and 24 respectively in order to move the second offset sections 40 and 42 arcuately. The dual conical surfaces 50 are oriented with their axes in a direction perpendicular to the axes 32 and 34 of the lift rods 22 and 24 and are provided with a single means for moving both surfaces.

Figure 4:
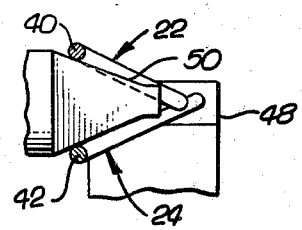
FIG. 4 is a sectional view taken along the lines 4—4 of FIG. 3 in the direction of the arrows.
Figure 6:
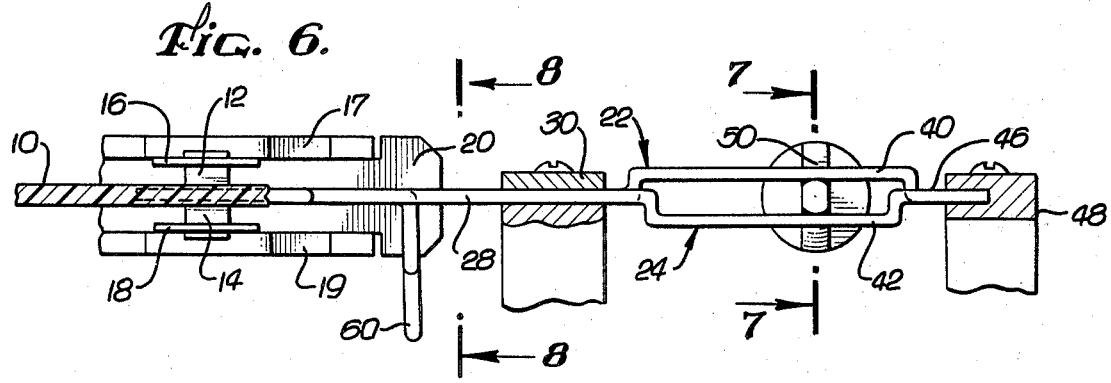
FIG. 6 is a view similar to that shown in FIG. 3, with the magnetic heads loaded onto the magnetic disc.

As seen in FIG. 4, the second offset sections 40 and 42 of the lift rods 22 and 24, respectively, ride on the dual conical surfaces or ramps 50. In FIG. 4, the second offset sections 40 and 42 are shown riding upon the larger diametered portions of the conical surfaces 50, while in FIG. 7, the second offset sections 40 and 42 are shown riding on the smaller diametered portions of conical surfaces 50. It will be seen by comparing FIGS. 4 and 7 that movement of the conical surfaces 50 results in the second offset sections 40 and 42 moving arcuately about the axes 32 and 34 respectively.

Figure 5:
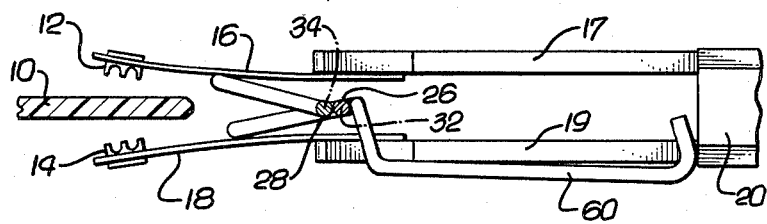
FIG. 5 is a sectional view taken along the lines 5—5 of FIG. 3 in the direction of the arrows.
Figure 7:
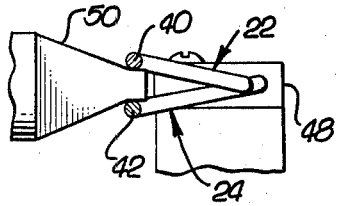
FIG. 7 is a sectional view taken along the lines 7—7 of FIG. 6 in the direction of the arrows, and is a view similar to that of FIG. 4.

FIGS. 5 and 8 illustrate the effect of the arcuate motion of second sections 40 and 42 on the corresponding first offset sections 36 and 38 and on the head mounting flexures 18 and 16. Thus, when the second offset sections 40 and 42 press on the larger portion of the conical surfaces 50 as shown in FIG. 4, the first offset sections 36 and 38 press on the head mounting flexures 18 and 16 respectively in the direction away from the disc in order to unload the magnetic heads 14 and 12 from the disc 10 as shown in FIG. 5. When the conical surfaces 50 are retracted away from the axes 32 and 34 of the lift rods 22 and 24 respectively, the second offset sections 40 and 42 press on the smaller diametered portions of the conical surfaces 50, such as is shown in FIG. 7, while the first offset sections 36 and 38 move arcuately to the positions shown in FIG. 8 where they are no longer pressing upon the head mounting flexures 18 and 16 respectively, thereby permitting the magnetic heads 14 and 12 to be loaded upon the disc 10.

It will be appreciated that the angular separation about the axis 32 of the first offset section 36 and the second offset section 40 of the lift rod 22, the radial locations of those sections with respect to the axis 32 and the particular cooperating conical surface is selected to produce sufficient arcuate motion of the first offset section to displace the head mounting flexure 18 and that this selection depends upon the positioning of the lift rod 22 and the range of motion of the dual conical surfaces 50. The angular separation about the axis 34 of the first offset section 38 and the second offset section 42 of the lift rod 24, the radial locations of those sections, and the particular cooperating conical surface is similarly selected.

An o-ring load spring 52 encircles the second offset sections 40 and 42 of lift rods 22 and 24 respectively and is stretched and placed over pin 54 which is located beyond the ends of the lift rod 22 and 24 and further from the axes 32 and 34 than are the second offset sections 40 and 42. The o-ring load spring 52 serves two functions. It ensures that the short pivoting sections 44 and 46 of the lift rods 22 and 24 do not slide out of the terminating mounting block 48 in a direction towards the head lift arms 16 and 18 and also provides a force to press the second offset sections 40 and 42 upon the dual conical surfaces 50.

In the preferred embodiment, the dual conical surfaces 50 are moved by means of a linear stepper motor 56 which moves a rod 58 along its length. The dual conical surfaces 50 are coupled to the end of rod 58. These components, i.e., the linear stepper motor 56, the rod 58 and the dual conical surfaces 50 are positioned so that the dual conical surfaces 50 are displaced by the stepper motor 56 in a direction perpendicular to the axes 32 and 34 of the lift rods 22 and 24 respectively.

A linear stepper motor is selected because of the ability to control its motion very accurately. Stepper motor 56 is controlled by pulses from a microprocessor, which also controls many of the other components within the disc-drive assembly.

The motion of the stepper motor 56 is in discrete increments and not continuous. However the motion of the magnetic heads 12 and 14 as they are being loaded and unloaded onto the magnetic disc 10 is essentially continuous. This is due to the inherent flexibility of the components between the magnetic heads 12 and 14 and the stepper motor 56. Since these components, especially the head mounting flexures 16 and 18 and the lift rods 22 and 24 inherently have some flexibility and are not rigidly attached to the stepper motor 56 itself, they, at least at their ends which are furthest from the stepper motor 56, in conformance with Newton's First Law of Motion, tend to remain in motion even while the stepper motor 56 momentarily stops.

An additional feature of the preferred embodiment of the present invention is a carriage restraining rod 60 which is attached to lift rod 22. Carriage restraining rod 60 extends at approximately a 90 degree angle from lift rod 22. With lift rod 22 deployed to lift the magnetic head 14 off of the disc 10, carriage restraining rod 60 extends toward carriage 20 and is positioned adjacent to the front of carriage 20. Carriage 20 cannot accidentally move toward disc 10 with lift rod 22 and carriage restraining rod 60 so positioned. However, after the dual conical surfaces 50 have been retracted to permit the magnetic heads 12 and 14 to be loaded upon the disc 10, the resultant rotation of lift rod 22 also results in carriage restraining rod 60 rotating downward so that it is no longer adjacent to carriage 20 and carriage 20 is thus no longer restrained from moving toward the disc 10. Carriage restraining rod 60 is therefore a safety feature which prevents the accidental movement of carriage 20 when the heads 12 and 14 are in the lifted position.

In the preferred embodiment of the present invention, when a cartridge is inserted into the disc-drive assembly, the two magnetic heads 12 and 14 on either side of the disc 10 are in the lifted position. The microprocesser controlling the disc-drive assembly is then started and sends a fraction of a pulse train to the linear stepper motor 56 causing the dual conical surfaces 50 to retract a small amount, but not enough to load the magnetic heads 12 and 14 onto the surfaces of the disc 10. This motion activates an interlock for the access door to the disc-drive assembly so that the disc 10 may be rotated to initiate a purge cycle for the cartridge. The rotation of the disc 10 is then stopped and the remainder of the pulse train is sent to the linear stepper motor 56. Since the heads 12 and 14 are in the lifted position, they are pressing upon the larger diametered portion of the dual conical surfaces 50. The pulse train provided to the linear stepper motor 56 causes the dual conical surfaces 50 to move away from the axes 32 and 34 of the lift rods 22 and 24 respectively. This gently loads the magnetic heads 12 and 14 upon the surfaces of the disc 10 near the edge of the disc 10 while the disc 10 is stationary. Thereafter the disc 10 may be rotated. It is not necessary to load and unload the magnetic heads 12 and 14 from the disc 10 when it is desired to move the magnetic heads 12 and 14 from tracks at one radius on the disc 10 to tracks at another radius. This is because while the disc 10 is rotating, air bearings are provided, due to the relative motion of the disc 10 and the heads 12 and 14, between the surface of the disc 10 and the heads 12 and 14.

When it is desired to remove the cartridge from the disc-drive assembly, the magnetic heads 12 and 14 are moved toward the edge of the disc 10 while it is rotating and the present invention activated to lift the heads 12 and 14 from the disc 10 as described.

While the present invention is useful in loading magnetic heads of the Winchester type onto a stationary magnetic disc, it will be appreciated by those skilled in the art, that the mechanism is useful for controllably loading virtually any type of magnetic head upon either a flexible or rigid magnetic disc.

Even though the presently preferred embodiment has been described with respect to a specific configuration, there are many other configurations and variations that are, of course, within the scope of the present invention.

For example, the stepper motor could rotate a shaft having screw threads on its surface. Corresponding screw threads could be carried by an interior surface on the dual conical surfaces or ramps 50, which screw threads would cause the dual conical surfaces or ramps 50 to function as a nut. The dual conical surfaces or ramps 50 would, of course, not be allowed to rotate while the interiorly disposed screw threads would cooperate with the screw threads on the rotating shaft in order to move the dual conical surface or ramps 50 along the direction of the shaft.

As another example of a configuration within the scope of the present invention, it is not necessary, although it is desirable, that the first and second offset sections of each lift rod be located on opposite sides of the pivoting section of the lift rod; they could be located on the same side if desired.

Another example of a configuration that is within the scope of the present invention uses an elliptical cam which is rotatable in a plane parallel to the pivot axes 32 and 34 of the lift rods 22 and 24 and situated between the second offset sections 40 and 42 of the lift rods 22 and 24 respectively. In this configuration, second offset sections 40 and 42 of the lift rods 22 and 24 would press upon the edges of the elliptical cam. If the elliptical cam were initially oriented with its major axis parallel to the second offset sections 40 and 42, a rotation of this cam 90 degrees would result in its minor axis being parallel to the second offset sections 40 and 42. Such a rotation of the elliptical cam would arcuately displace the second offset sections 40 and 42 and, correspondingly, the first offset sections 36 and 38. It will readily be appreciated that the magnetic heads 12 and 14 can be lifted and loaded using this arrangement in a manner similar to that already described with respect to the preferred embodiment. However, since rotary motion of the stepper motor is being directly used in this configuration and not converted to linear motion a different stepper motor may be required. For the preferred embodiment described herein, a low-cost stepper motor having 24 steps per revolution is suitable, since the rotary motion of the motor is transformed to linear motion to move the dual conical surfaces or ramps. The use of such a motor having only 24 steps per revolution would possibly not be suitable for use within an elliptical cam, as the loading and unloading motion would not be smooth enough. However, other means, including other stepper motors could be used.

Thus it should be recognized that many modifications and variations not discussed herein may readily occur to those skilled in the art. Consequently it is intended that the claims be interpreted to cover such modifications and equivalents.

I claim:

1. A mechanism for lifting at least one magnetic head from a rotatable magnetic disc and for gently loading said at least one magnetic head upon said disc, each said at least one magnetic head being attached to one end of a different movable arm, the other end of the movable arm being attached to a carriage for translating said at least one head radially with respect to said disc, said mechanism comprising:
    a rod corresponding to each said magnetic head, said rod having:
        a first straight section of its length defining an axis of rotation about which said rod is rotatable;
        a second section of its length offset from and parallel to said first section, said second section rotatable about said axis through an arc, said arm and said second section pressing against one another as said second section is rotated through at least a portion of said arc, the tangent to said arc where said arm and second section press against one another remaining approximately perpendicular to said arm; and
        a third section of its length offset from and parallel to said first section; and
    means at said third section for controllably rotating said rod about said axis so that said second section is rotated selectively in either direction through said arc, said head being lifted from said disc when the second section is rotated in one direction through a portion of said arc and loaded upon said disc when the second section is rotated in the opposite direction through a portion of said arc.

2. A mechanism as in claim 1 wherein said means at said third section for controllably rotating said rod about said axis comprises:
    a movable ramp having an inclined portion facing said third section, said third section adjacent to and in contact with said inclined portion of said ramp, and said ramp movable in a direction generally toward and away from said axis; and
    a means coupled to said ramp for moving said ramp toward and away from said axis, said third section of said rod remaining in contact with said inclined portion when said ramp is moved toward and away from said axis, whereby said third section of said rod is rotated in one direction about said axis when said ramp moves toward said axis and is rotated in the opposite direction when said ramp moves away from said axis.

3. A mechanism as in claim 2 wherein said means for moving said inclined portion of said ramp comprises an electrical motor coupled to said ramp by means of a linearly movable shaft oriented in the direction of motion of said ramp, said shaft being coupled at one end to said ramp and at the other end to said electrical motor and being driven by said electrical motor to move said ramp toward and away from said axis.

4. A mechanism as in claim 3 wherein said electrical motor is a linear stepper motor for moving said shaft linearly along its length.

5. A mechanism as in claim 1 further comprising:
    a restraining member attached to said rod at said first section, said restraining member extending outward radially with respect to said axis, said restraining member oriented to block the movement of said carriage when said rod is rotated so that said head is lifted from said disc, and oriented to not block the movement of said carriage when said rod is rotated so that said head is loaded upon said disc.

6. A mechanism as in claim 1 wherein said at least one magnetic head is two magnetic heads located on opposite sides of said disc and wherein:
    the axes of the two rods are adjacent and parallel, the third sections of said rods being located opposite to one another with respect to a plane adjacent their axes and parallel to said disc; and
    the means for controllably rotating the two rods about their axes comprises:
        a movable ramp having two inclined portions, one of said inclined portions facing a third section of each rod, said third sections adjacent to and in contact with the respective inclined portions, said ramp movable in a direction generally toward and away from said axes;
        a means coupled to said ramp for moving said ramp toward and away from said axes, said third sections of said rods remaining in contact with the respective inclined portions when said ramp is moved toward and away from said axes, whereby said third sections of said rods are each rotated in different directions about their respective axes when said ramp moves toward said axes and are each rotated in the opposite direction when said ramp moves away from said axes.

7. A mechanism as in claim 6 wherein said means for moving said inclined portion of said ramp comprises an electrical motor coupled to said ramp by means of a linearly movable shaft oriented in the direction of motion of said ramp, said shaft being coupled at one end to said ramp and at the other end to said electrical motor and being driven by said electrical motor to move said ramp toward and away from said axis.

8. A mechanism as in claim 7 wherein said electrical motor is a linear stepper motor for moving said shaft linearly along its length.

* * * * *